(12) United States Patent
McMillen

(10) Patent No.: US 11,480,481 B2
(45) Date of Patent: Oct. 25, 2022

(54) ALIGNMENT MECHANISMS SENSOR SYSTEMS EMPLOYING PIEZORESISTIVE MATERIALS

(71) Applicant: BeBop Sensors, Inc., Berkeley, CA (US)

(72) Inventor: Keith A. McMillen, Berkeley, CA (US)

(73) Assignee: BeBop Sensors, Inc., Berkeley, CA (US)

(*) Notice: Subject to any disclaimer, the term of this patent is extended or adjusted under 35 U.S.C. 154(b) by 23 days.

(21) Appl. No.: 16/806,297

(22) Filed: Mar. 2, 2020

(65) Prior Publication Data

US 2020/0292399 A1    Sep. 17, 2020

Related U.S. Application Data

(60) Provisional application No. 62/817,923, filed on Mar. 13, 2019.

(51) Int. Cl.
| | | |
|---|---|---|
| *G01L 1/18* | (2006.01) | |
| *G01L 1/20* | (2006.01) | |
| *A43B 3/34* | (2022.01) | |

(52) U.S. Cl.
CPC ............ *G01L 1/205* (2013.01); *A43B 3/34* (2022.01); *G01L 1/18* (2013.01)

(58) Field of Classification Search
CPC .............. G01L 1/205; G01L 1/18; G01L 1/26
See application file for complete search history.

(56) References Cited

U.S. PATENT DOCUMENTS

| | | | |
|---|---|---|---|
| 4,294,014 | A | 10/1981 | Baumann et al. |
| 4,438,291 | A | 3/1984 | Eichelberger et al. |
| 4,489,302 | A | 12/1984 | Eventoff |
| 4,515,404 | A | 5/1985 | Nishimura et al. |
| 4,693,530 | A | 9/1987 | Stillie et al. |
| 4,734,034 | A | 3/1988 | Maness et al. |
| 4,745,301 | A | 5/1988 | Michalchik |
| 4,790,968 | A | 12/1988 | Ohkawa et al. |
| 4,852,443 | A | 8/1989 | Duncan et al. |
| 5,033,291 | A | 7/1991 | Podoloff et al. |
| 5,079,949 | A | 1/1992 | Tamori |
| 5,128,880 | A | 7/1992 | White |
| 5,131,306 | A | 7/1992 | Yamamoto |
| 5,159,159 | A | 10/1992 | Asher |
| 5,219,292 | A | 6/1993 | Dickirson et al. |
| 5,237,520 | A | 8/1993 | White |
| 5,288,938 | A | 2/1994 | Wheaton |

(Continued)

FOREIGN PATENT DOCUMENTS

| | | |
|---|---|---|
| CN | 200980381 Y | 11/2007 |
| CN | 201920728 U | 8/2011 |

(Continued)

OTHER PUBLICATIONS

U.S. Notice of Allowance dated May 13, 2020 issued in U.S. Appl. No. 16/362,017.

(Continued)

*Primary Examiner* — Tran M. Tran
(74) *Attorney, Agent, or Firm* — Weaver Austin Villeneuve & Sampson LLP

(57) ABSTRACT

Methods and apparatus are described that improve the reliability and configurability of sensor systems.

15 Claims, 2 Drawing Sheets

(56) References Cited

U.S. PATENT DOCUMENTS

| | | |
|---|---|---|
| 5,316,017 A | 5/1994 | Edwards et al. |
| 5,386,720 A | 2/1995 | Toda et al. |
| 5,429,092 A | 7/1995 | Kamei |
| 5,571,973 A | 11/1996 | Taylot |
| 5,578,766 A | 11/1996 | Kondo |
| 5,624,132 A | 4/1997 | Blackburn et al. |
| 5,659,395 A | 8/1997 | Brown et al. |
| 5,695,859 A | 12/1997 | Burgess |
| 5,729,905 A | 3/1998 | Mathiasmeier et al. |
| 5,815,585 A | 9/1998 | Klippel |
| 5,822,223 A | 10/1998 | Genest |
| 5,866,829 A | 2/1999 | Pecoraro |
| 5,878,359 A | 3/1999 | Takeda |
| 5,943,044 A | 8/1999 | Martinelli et al. |
| 5,989,700 A | 11/1999 | Krivopal |
| 6,029,358 A | 2/2000 | Mathiasmeier et al. |
| 6,032,109 A | 2/2000 | Ritmiller, III |
| 6,049,327 A | 4/2000 | Walker et al. |
| 6,087,930 A | 7/2000 | Kulka et al. |
| 6,121,869 A | 9/2000 | Burgess |
| 6,141,643 A | 10/2000 | Harmon |
| 6,155,120 A | 12/2000 | Taylor |
| 6,215,055 B1 | 4/2001 | Saravis |
| 6,216,545 B1 | 4/2001 | Taylor |
| 6,304,840 B1 | 10/2001 | Vance et al. |
| 6,331,893 B1 | 12/2001 | Brown et al. |
| 6,360,615 B1 | 3/2002 | Smela |
| 6,388,556 B1 | 5/2002 | Imai et al. |
| 6,452,479 B1 | 9/2002 | Sandbach |
| 6,486,776 B1 | 11/2002 | Pollack et al. |
| 6,490,515 B1 | 12/2002 | Okamura et al. |
| 6,531,951 B2 | 3/2003 | Serban et al. |
| 6,609,054 B2 | 8/2003 | Wallace |
| 6,626,046 B2 | 9/2003 | Taguchi et al. |
| 6,687,523 B1 | 2/2004 | Jayaramen et al. |
| 6,763,320 B2 | 7/2004 | Kimble |
| 6,815,602 B2 | 11/2004 | De Franco |
| 6,822,635 B2 | 11/2004 | Shahoian et al. |
| 6,829,942 B2 | 12/2004 | Yanai et al. |
| 6,964,205 B2 | 11/2005 | Papakostas et al. |
| 7,037,268 B1 | 5/2006 | Sleva et al. |
| 7,066,887 B2 | 6/2006 | Flesch et al. |
| 7,109,068 B2 | 9/2006 | Akram et al. |
| 7,113,856 B2 | 9/2006 | Theiss et al. |
| 7,138,976 B1 | 11/2006 | Bouzit et al. |
| 7,157,640 B2 | 1/2007 | Baggs |
| 7,162,344 B2 | 1/2007 | Kojima et al. |
| 7,275,452 B2 * | 10/2007 | Kurtz .................... G01L 1/2225 73/862.391 |
| 7,302,866 B1 | 12/2007 | Malkin et al. |
| 7,311,009 B2 | 12/2007 | Kotovsky |
| 7,332,670 B2 | 2/2008 | Fujiwara et al. |
| 7,409,256 B2 | 8/2008 | Lin et al. |
| 7,439,465 B2 | 10/2008 | Parkinson |
| 7,483,866 B2 | 1/2009 | Luo |
| 7,493,230 B2 | 2/2009 | Schwartz et al. |
| 7,536,794 B2 | 5/2009 | Hay et al. |
| 7,584,666 B2 | 9/2009 | Kim et al. |
| 7,608,776 B2 | 10/2009 | Ludwig |
| 7,719,007 B2 | 5/2010 | Tompkins et al. |
| 7,726,199 B2 | 6/2010 | Shkel et al. |
| 7,754,956 B2 | 7/2010 | Gain et al. |
| 7,780,541 B2 | 8/2010 | Bauer |
| 7,855,718 B2 | 12/2010 | Westerman |
| 7,878,075 B2 | 2/2011 | Johansson et al. |
| 7,928,312 B2 | 4/2011 | Sharma |
| 7,980,144 B2 * | 7/2011 | Chang .................... G01L 1/205 73/862.392 |
| 7,984,544 B2 | 7/2011 | Rosenberg |
| 8,109,149 B2 | 2/2012 | Kotovsky |
| 8,117,922 B2 | 2/2012 | Xia et al. |
| 8,120,232 B2 | 2/2012 | Daniel et al. |
| 8,127,623 B2 | 3/2012 | Son et al. |
| 8,161,826 B1 | 4/2012 | Taylor |
| 8,162,857 B2 | 4/2012 | Lanfermann et al. |
| 8,250,934 B2 | 8/2012 | Sakurai |
| 8,274,485 B2 | 9/2012 | Liu et al. |
| 8,346,684 B2 | 1/2013 | Mirbach et al. |
| 8,368,505 B2 | 2/2013 | Deppiesse et al. |
| 8,448,530 B2 | 5/2013 | Leuenberger et al. |
| 8,479,585 B2 | 7/2013 | Shaw-Klein |
| 8,536,880 B2 | 9/2013 | Philipp |
| 8,571,827 B2 | 10/2013 | Jang et al. |
| 8,587,422 B2 | 11/2013 | Andrews et al. |
| 8,661,917 B2 | 3/2014 | Jheng et al. |
| 8,680,390 B2 | 3/2014 | McMillen et al. |
| 8,714,020 B2 * | 5/2014 | Chiou .................... G01L 1/20 73/715 |
| 8,813,579 B2 | 8/2014 | Aufrere |
| 8,857,274 B2 | 10/2014 | Mamigonians |
| 8,880,358 B2 | 11/2014 | Cunningham |
| 8,884,913 B2 | 11/2014 | Saynac et al. |
| 8,892,051 B2 | 11/2014 | Yi et al. |
| 8,893,565 B2 | 11/2014 | White et al. |
| 8,904,876 B2 | 12/2014 | Taylor et al. |
| 8,925,392 B2 | 1/2015 | Esposito et al. |
| 8,925,393 B2 | 1/2015 | Cannard et al. |
| 8,928,014 B2 | 1/2015 | Tischler et al. |
| 8,945,328 B2 | 2/2015 | Longinotti-Buitoni et al. |
| 8,947,889 B2 | 2/2015 | Kelley et al. |
| 8,950,265 B2 | 2/2015 | Dunn et al. |
| 8,964,205 B2 | 2/2015 | Shimizu |
| 8,970,513 B2 | 3/2015 | Kwon et al. |
| 9,032,804 B2 | 5/2015 | Granado et al. |
| 9,038,482 B2 | 5/2015 | Xia et al. |
| 9,075,404 B2 | 7/2015 | McMillen et al. |
| 9,076,419 B2 | 7/2015 | McMillen et al. |
| 9,112,058 B2 | 8/2015 | Bao et al. |
| 9,116,569 B2 | 8/2015 | William et al. |
| 9,164,586 B2 | 10/2015 | Zellers et al. |
| 9,182,302 B2 | 11/2015 | Lim et al. |
| 9,271,665 B2 | 3/2016 | Sarrafzadeh et al. |
| 9,413,376 B2 | 8/2016 | Lowe et al. |
| 9,417,693 B2 | 8/2016 | Seth |
| 9,442,614 B2 | 9/2016 | McMillen |
| 9,459,172 B2 * | 10/2016 | Chen .................... G01L 9/0052 |
| 9,480,582 B2 | 11/2016 | Lundborg |
| 9,529,433 B2 | 12/2016 | Shankar et al. |
| 9,546,921 B2 | 1/2017 | McMillen et al. |
| 9,582,035 B2 | 2/2017 | Connor |
| 9,612,102 B2 | 4/2017 | Reese et al. |
| 9,652,101 B2 | 5/2017 | McMillen et al. |
| 9,671,297 B2 * | 6/2017 | Sibbett .................... G06F 3/041 |
| 9,682,856 B2 | 6/2017 | Whitesides et al. |
| 9,696,223 B2 | 7/2017 | Lisseman et al. |
| 9,696,833 B2 | 7/2017 | McMillen |
| 9,710,060 B2 | 7/2017 | McMillen et al. |
| 9,721,553 B2 | 8/2017 | McMillen et al. |
| 9,753,568 B2 | 9/2017 | McMillen |
| 9,756,895 B2 | 9/2017 | Rice et al. |
| 9,827,996 B2 | 11/2017 | McMillen |
| 9,836,151 B2 | 12/2017 | McMillen |
| 9,851,267 B1 | 12/2017 | Ma et al. |
| 9,860,982 B1 | 1/2018 | Main et al. |
| 9,863,823 B2 | 1/2018 | McMillen |
| 9,891,119 B2 * | 2/2018 | Samejima ............... G01L 19/04 |
| 9,891,718 B2 | 2/2018 | Connor |
| 9,965,076 B2 | 5/2018 | McMillen |
| 9,970,832 B2 | 5/2018 | Hong et al. |
| 9,993,921 B2 | 6/2018 | Lessing et al. |
| 10,046,671 B2 | 8/2018 | Seiller et al. |
| 10,064,270 B2 | 8/2018 | Jur et al. |
| 10,070,680 B2 * | 9/2018 | Molyneux ............... A43B 3/34 |
| 10,076,143 B2 | 9/2018 | Marriott et al. |
| 10,082,381 B2 | 9/2018 | McMillen et al. |
| 10,114,493 B2 | 10/2018 | McMillen et al. |
| 10,268,315 B2 | 4/2019 | McMillen et al. |
| 10,282,011 B2 | 5/2019 | McMillen et al. |
| 10,288,507 B2 | 5/2019 | McMillen et al. |
| 10,352,787 B2 | 7/2019 | McMillen et al. |
| 10,362,989 B2 | 7/2019 | McMillen et al. |
| 10,654,486 B2 | 5/2020 | McMillen et al. |
| 10,724,909 B2 * | 7/2020 | Abbasi Gavarti ........ G01L 1/18 |
| 10,753,814 B2 | 8/2020 | McMillen et al. |

(56) References Cited

U.S. PATENT DOCUMENTS

| | | |
|---|---|---|
| 10,802,641 B2 | 10/2020 | McMillen et al. |
| 10,809,830 B2 * | 10/2020 | Kim ................ G01L 1/2281 |
| 10,884,496 B2 | 1/2021 | McMillen et al. |
| 11,147,510 B2 | 10/2021 | McMillen et al. |
| 11,226,248 B2 * | 1/2022 | Sun ................ G01L 5/165 |
| 11,269,471 B2 * | 3/2022 | Lin ................ G06F 3/03547 |
| 2002/0078757 A1 | 6/2002 | Hines et al. |
| 2002/0180578 A1 | 12/2002 | Sandbach |
| 2004/0031180 A1 | 2/2004 | Ivanov |
| 2004/0060427 A1 | 4/2004 | Franco |
| 2004/0093746 A1 | 5/2004 | Varsallona |
| 2004/0118619 A1 | 6/2004 | Gray et al. |
| 2004/0183648 A1 | 9/2004 | Weber et al. |
| 2004/0189145 A1 | 9/2004 | Pletner et al. |
| 2004/0249536 A1 | 12/2004 | Hattori |
| 2004/0252007 A1 | 12/2004 | Lussey et al. |
| 2005/0072249 A1 | 4/2005 | Maeda et al. |
| 2005/0109095 A1 | 5/2005 | Sinnett |
| 2005/0220673 A1 | 10/2005 | Thaysen |
| 2006/0103192 A1 | 5/2006 | Norton |
| 2006/0150752 A1 | 7/2006 | Lorenz et al. |
| 2006/0192417 A1 | 8/2006 | Ellinger et al. |
| 2006/0209050 A1 | 9/2006 | Serban |
| 2006/0274055 A1 | 12/2006 | Reynolds et al. |
| 2006/0289469 A1 | 12/2006 | Chandra et al. |
| 2007/0063992 A1 | 3/2007 | Lundquist |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo de Moraes |
| 2008/0046152 A1 | 2/2008 | Ohtake et al. |
| 2008/0069412 A1 | 3/2008 | Champagne et al. |
| 2008/0158145 A1 | 7/2008 | Westerman |
| 2008/0189827 A1 | 8/2008 | Bauer |
| 2008/0254824 A1 | 10/2008 | Moraes |
| 2009/0013793 A1 | 1/2009 | Kim et al. |
| 2009/0049980 A1 | 2/2009 | Sharma |
| 2009/0134966 A1 | 5/2009 | Baker |
| 2009/0237374 A1 | 9/2009 | Li et al. |
| 2009/0272197 A1 | 11/2009 | Granado et al. |
| 2009/0301190 A1 | 12/2009 | Ross, Jr. et al. |
| 2009/0303400 A1 | 12/2009 | Hou et al. |
| 2010/0066572 A1 | 3/2010 | Dietz et al. |
| 2010/0123686 A1 | 5/2010 | Klinghult et al. |
| 2010/0134327 A1 | 6/2010 | Dinh et al. |
| 2010/0149108 A1 | 6/2010 | Hotelling et al. |
| 2010/0179724 A1 | 7/2010 | Weston |
| 2010/0199777 A1 | 8/2010 | Hooper et al. |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0005090 A1 | 1/2011 | Lee et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0199284 A1 | 8/2011 | Davis et al. |
| 2011/0203390 A1 | 8/2011 | Tao et al. |
| 2011/0221564 A1 | 9/2011 | Deppiesse et al. |
| 2011/0231117 A1 | 9/2011 | Cardinale |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2011/0279409 A1 | 11/2011 | Salaverry et al. |
| 2011/0292049 A1 | 12/2011 | Muravsky |
| 2011/0302694 A1 | 12/2011 | Wang et al. |
| 2012/0007831 A1 | 1/2012 | Chang et al. |
| 2012/0024132 A1 | 2/2012 | Wallace et al. |
| 2012/0026124 A1 | 2/2012 | Li et al. |
| 2012/0055257 A1 | 3/2012 | Shaw-Klein |
| 2012/0090408 A1 | 4/2012 | Jheng et al. |
| 2012/0097009 A1 | 4/2012 | Eventoff et al. |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0222498 A1 | 9/2012 | Mamigonians |
| 2012/0234105 A1 | 9/2012 | Taylor |
| 2012/0246795 A1 | 10/2012 | Scheffler et al. |
| 2012/0258302 A1 | 10/2012 | Hunt et al. |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0299127 A1 | 11/2012 | Fujii et al. |
| 2012/0303332 A1 | 11/2012 | Mangione-Smith |
| 2012/0312102 A1 | 12/2012 | Alvarez et al. |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0113704 A1 | 5/2013 | Sarrafzadeh et al. |
| 2013/0015817 A1 | 6/2013 | Horst et al. |
| 2013/0165809 A1 | 6/2013 | Abir |
| 2013/0192071 A1 | 8/2013 | Esposito et al. |
| 2013/0203201 A1 | 8/2013 | Britton et al. |
| 2013/0211208 A1 | 8/2013 | Varadan et al. |
| 2013/0214365 A1 | 8/2013 | Schlarmann et al. |
| 2013/0239787 A1 | 9/2013 | McMillen et al. |
| 2013/0248024 A1 | 9/2013 | Dunn et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0007706 A1 | 1/2014 | Aufrere et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0060211 A1 | 3/2014 | Van den Broeck |
| 2014/0090488 A1 | 4/2014 | Taylor et al. |
| 2014/0104776 A1 | 4/2014 | Clayton et al. |
| 2014/0104792 A1 | 4/2014 | Jeziorek |
| 2014/0107966 A1 | 4/2014 | Xia et al. |
| 2014/0107967 A1 | 4/2014 | Xia et al. |
| 2014/0107968 A1 | 4/2014 | Xia et al. |
| 2014/0125124 A1 | 5/2014 | Verner |
| 2014/0130270 A1 | 5/2014 | Baudouin et al. |
| 2014/0130593 A1 | 5/2014 | Ciou et al. |
| 2014/0146501 A1 | 5/2014 | Thiel et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222173 A1 | 8/2014 | Giedwoyn et al. |
| 2014/0222243 A1 | 8/2014 | McMillen et al. |
| 2014/0238153 A1 | 8/2014 | Wood et al. |
| 2014/0240214 A1 | 8/2014 | Liu et al. |
| 2014/0264407 A1 | 9/2014 | Tischler et al. |
| 2014/0288383 A1 | 9/2014 | Barnett |
| 2014/0318699 A1 | 10/2014 | Longinotti-Buitoni et al. |
| 2014/0347076 A1 | 11/2014 | Barton et al. |
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0177083 A1 * | 6/2015 | Redmond ................ G01L 3/242 |
| | | 73/379.01 |
| 2015/0231991 A1 | 8/2015 | Yetukuri et al. |
| 2015/0248159 A1 | 9/2015 | Luo et al. |
| 2015/0261372 A1 | 9/2015 | McMillen et al. |
| 2015/0316434 A1 | 11/2015 | McMillen et al. |
| 2015/0317964 A1 | 11/2015 | McMillen et al. |
| 2015/0325527 A1 * | 11/2015 | Rosenberg ................ H01L 21/82 |
| | | 257/499 |

(56) References Cited

U.S. PATENT DOCUMENTS

| | | |
|---|---|---|
| 2015/0328492 A1 | 11/2015 | Marriott et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1 | 11/2015 | McMillen et al. |
| 2015/0331533 A1 | 11/2015 | McMillen et al. |
| 2015/0362389 A1* | 12/2015 | Yanev ................ G01L 1/26 73/862.041 |
| 2015/0370396 A1 | 12/2015 | Hotelling et al. |
| 2016/0052131 A1 | 2/2016 | Lessing et al. |
| 2016/0054798 A1 | 2/2016 | Messingher et al. |
| 2016/0070347 A1 | 3/2016 | McMillen et al. |
| 2016/0073539 A1 | 3/2016 | Driscoll et al. |
| 2016/0147352 A1 | 5/2016 | Filiz et al. |
| 2016/0162022 A1 | 6/2016 | Seth |
| 2016/0169754 A1 | 6/2016 | Kowalewski et al. |
| 2016/0175186 A1 | 6/2016 | Shadduck |
| 2016/0187973 A1 | 6/2016 | Shankar et al. |
| 2016/0194792 A1 | 7/2016 | Satharasinghe et al. |
| 2016/0209441 A1 | 7/2016 | Mazzeo et al. |
| 2016/0238547 A1 | 8/2016 | Park et al. |
| 2016/0246369 A1 | 8/2016 | Osman |
| 2016/0252412 A1 | 9/2016 | McMillen et al. |
| 2016/0270727 A1 | 9/2016 | Berg et al. |
| 2016/0278709 A1 | 9/2016 | Granado et al. |
| 2016/0313798 A1 | 10/2016 | Connor |
| 2016/0318356 A1 | 11/2016 | McMillen et al. |
| 2016/0340534 A1 | 11/2016 | Wijesundara et al. |
| 2016/0358849 A1 | 12/2016 | Jur et al. |
| 2016/0375910 A1 | 12/2016 | McMillen et al. |
| 2017/0000369 A1 | 1/2017 | Hyde et al. |
| 2017/0038881 A1 | 2/2017 | McMillen |
| 2017/0056644 A1 | 3/2017 | Chahine et al. |
| 2017/0059426 A1 | 3/2017 | Choi et al. |
| 2017/0086519 A1 | 3/2017 | Vigano et al. |
| 2017/0108929 A1 | 4/2017 | Sinko et al. |
| 2017/0110103 A1 | 4/2017 | McMillen et al. |
| 2017/0127736 A1 | 5/2017 | Roberts et al. |
| 2017/0167931 A1 | 6/2017 | McMillen et al. |
| 2017/0176267 A1 | 6/2017 | Keller et al. |
| 2017/0212638 A1 | 7/2017 | McMillen |
| 2017/0215495 A1 | 8/2017 | Okumiya et al. |
| 2017/0303853 A1 | 10/2017 | McMillen et al. |
| 2017/0305301 A1 | 10/2017 | McMillen et al. |
| 2017/0350772 A1* | 12/2017 | DeGanello ............... H01B 1/24 |
| 2017/0361045 A1 | 12/2017 | Fu et al. |
| 2018/0003579 A1 | 1/2018 | Esposito et al. |
| 2018/0015932 A1 | 1/2018 | McMillen et al. |
| 2018/0077976 A1 | 3/2018 | Keller et al. |
| 2018/0094991 A1 | 4/2018 | McMillen et al. |
| 2018/0263563 A1 | 9/2018 | McMillen et al. |
| 2019/0034019 A1 | 1/2019 | McMillen et al. |
| 2019/0219465 A1 | 7/2019 | McMillen et al. |
| 2019/0391651 A1* | 12/2019 | Chowdhury ......... G10H 1/0556 |
| 2020/0012344 A1 | 1/2020 | McMillen et al. |
| 2020/0150761 A1 | 5/2020 | Hogbin |
| 2020/0200621 A1 | 6/2020 | McMillen et al. |
| 2020/0400519 A1 | 12/2020 | McMillen et al. |
| 2021/0034213 A1 | 2/2021 | Sepehr et al. |
| 2021/0042006 A1 | 2/2021 | McMillen et al. |

FOREIGN PATENT DOCUMENTS

| | | |
|---|---|---|
| CN | 102551728 A | 7/2012 |
| CN | 202396601 U | 8/2012 |
| CN | 203234132 U | 10/2013 |
| CN | 103495981 A | 1/2014 |
| CN | 102406280 B | 3/2014 |
| DE | 102 12 023 A1 | 10/2003 |
| DE | 11 2010 004 038 T5 | 9/2012 |
| EP | 0 014 022 B1 | 11/1984 |
| EP | 0 211 984 | 3/1987 |
| EP | 2 682 724 A1 | 1/2014 |
| JP | S47-18925 | 5/1972 |
| JP | H04-011666 A | 1/1992 |
| JP | H06-323929 A | 11/1994 |
| JP | H08-071978 | 3/1996 |
| JP | H08-194481 A | 7/1996 |
| JP | H10-198503 A | 7/1998 |
| JP | 2000-267664 A | 9/2000 |
| JP | 2006-503350 | 1/2006 |
| JP | 2007-503052 A | 2/2007 |
| JP | 2008-515008 A | 5/2008 |
| JP | 2009-543030 A | 12/2009 |
| JP | 2010-503113 A | 1/2010 |
| JP | 2011-502313 A | 1/2011 |
| JP | 2012-521550 A | 9/2012 |
| JP | 2012-220315 A | 11/2012 |
| JP | 2014-077662 A | 5/2014 |
| JP | 2017-518338 | 12/2017 |
| KR | 10-2007-0008500 A | 1/2007 |
| KR | 100865148 B1 | 10/2008 |
| KR | 10-1362742 B1 | 2/2014 |
| KR | 10-20147-0071693 A | 6/2014 |
| NL | 8900820 A | 11/1990 |
| RU | 2 533 539 C1 | 11/2014 |
| WO | WO 99/020179 A1 | 4/1999 |
| WO | WO 2007/024875 A2 | 3/2007 |
| WO | WO 2008/032661 | 3/2008 |
| WO | WO 2009/155891 A1 | 12/2009 |
| WO | WO 2011/047171 A2 | 4/2011 |
| WO | WO 2013/116242 | 8/2013 |
| WO | WO 2013/181474 | 12/2013 |
| WO | WO 2014/058473 | 4/2014 |
| WO | WO 2015/175317 A1 | 11/2015 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |
| WO | WO 2017/184367 A1 | 10/2017 |

OTHER PUBLICATIONS

U.S. Office Action dated Mar. 19, 2020 issued in U.S. Appl. No. 14/728,873.
U.S. Notice of Allowance dated Jun. 15, 2020 issued in U.S. Appl. No. 14/728,873.
U.S. Office Action dated Aug. 4, 2021 issued in U.S. Appl. No. 16/948,131.
U.S. Final Office Action dated Apr. 28, 2020 issued in USSN 15/621,935.
U.S. Office Action dated Jul. 13, 2020 issued in U.S. Appl. No. 15/621,935.
U.S. Office Action dated Feb. 11, 2021 issued in U.S. Appl. No. 15/621,935.
U.S. Final Office Action dated Jun. 3, 2021 issued in U.S. Appl. No. 15/621,935.
U.S. Notice of Allowance dated Jul. 14, 2021 issued in U.S. Appl. No. 15/621,935.
U.S. Office Action dated May 28, 2020 issued in U.S. Appl. No. 16/449,017.
U.S. Notice of Allowance dated Nov. 23, 2020 issued in U.S. Appl. No. 16/449,017.
U.S. Office Action dated Jul. 12, 2021 issued in U.S. Appl. No. 16/692,626.
Japanese Office Action dated May 22, 2020 issued in JP 2017-518338.
Japanese Office Action dated Apr. 22, 2020 issued in JP 2018-114012.
Japanese Office Action dated Aug. 17, 2020 issued in JP 2018-114012.
German Office Action dated Sep. 29, 2020 issued in DE 112016004743.6.
Almassri, "Self-Calibration Algorithm for a Pressure Sensor with a Real-Time Approach Based on an Artificial Neural Network" Sensors, pp. 1-16, Aug. 5, 2018 (Year: 2018).

(56) References Cited

OTHER PUBLICATIONS

Bengtsson, "Lookup Table Optimization for Sensor Linearization in Small Embedded Systems" Journal of Sensor Technology, pp. 177-174. Dec. 6, 2012 (Year: 2012).
Brownlee, "How to Code a Neural Network with Backpropagation In Python (from scratch)" Machine Learning Mastery, Nov. 7, 2016,downloaded from https://machineleamingmastery.com/implement-backpropagation-algorithm-scratch-python/. downloaded Sep. 1, 2021 (Year: 2016).
Tech Target Contributor, "exponential function" TechTarget, Dec. 2005, downloaded from https://whatis.techtarget.com/definition/exponential-function downloaded Sep. 1, 2021 (Year: 2005).
U.S. Appl. No. 17/302,955, filed May 17, 2021 McMillen et al.
PCT International Search Report and Written Opinion dated Sep. 2, 2021 issued in PCT/US 2021/032908.
U.S. Notice of Allowance dated Sep. 15, 2021 issued in U.S. Appl. No. 16/948,131.
U.S. Office Action dated Sep. 12, 2012 issued in U.S. Appl. No. 12/904,657.
U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Notice of Allowance dated May 1, 2015 issued in U.S. Appl. No. 14/173,617.
U.S. Office Action dated Mar. 10, 2016 issued in U.S. Appl. No. 14/727,619.
U.S. Final Office Action dated Jul. 18, 2016 issued in U.S. Appl. No. 14/727,619.
U.S. Notice of Allowance dated Sep. 15, 2016 issued in U.S. Appl. No. 14/727,619.
U.S. Office Action dated Dec. 31, 2018 issued in U.S. Appl. No. 15/374,816.
U.S. Notice of Allowance dated Mar. 11, 2019 issued in U.S. Appl. No. 15/374,816.
U.S. Office Action dated Jan. 10, 2020 issued in U.S. Appl. No. 16/362,017.
U.S. Office Action dated Apr. 2, 2015 issued in U.S. Appl. No. 13/799,304.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Final Office Action dated Mar. 9, 2016 issued in U.S. Appl. No. 14/728,872.
U.S. Office Action dated Jun. 22, 2016 issued in U.S. Appl. No. 14/728,872.
U.S. Final Office Action dated Oct. 18, 2016 issued in U.S. Appl. No. 14/728,872.
U.S. Advisory Action dated Feb. 10, 2017 issued in U.S. Appl. No. 14/728,872.
U.S. Office Action dated May 19, 2017 issued in U.S. Appl. No. 14/728,872.
U.S. Notice of Allowance dated Oct. 16, 2017 issued in U.S. Appl. No. 14/728,872.
U.S. Office Action dated Jul. 25, 2016 issued in U.S. Appl. No. 14/728,873.
U.S. Office Action dated Dec. 30, 2016 issued in U.S. Appl. No. 14/728,873.
U.S. Final Office Action dated Mar. 31, 2017 issued in U.S. Appl. No. 14/728,873.
U.S. Advisory Action and Examiner initiated interview summary dated May 26, 2017 issued in U.S. Appl. No. 14/728,873.
U.S. Office Action dated Aug. 25, 2017 issued in U.S. Appl. No. 14/728,873.
U.S. Final Office Action dated Dec. 22, 2017 issued in U.S. Appl. No. 14/728,873.
U.S. Office Action dated Mar. 26, 2018 issued in U.S. Appl. No. 14/728,873.
U.S. Notice of Allowance dated Jul. 19, 2018 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Final Office Action dated Apr. 19, 2017 issued in U.S. Appl. No. 14/299,976.
U.S. Final Office Action dated Jun. 8, 2017 issued in U.S. Appl. No. 14/299,976.
U.S. Office Action dated Sep. 1, 2017 issued in U.S. Appl. No. 14/299,976.
U.S. Notice of Allowance dated Feb. 22, 2018 issued in U.S. Appl. No. 14/299,976.
U.S. Office Action dated Jan. 13, 2016 issued in U.S. Appl. No. 14/464,551.
U.S. Notice of Allowance dated Jun. 23, 2016 issued in U.S. Appl. No. 14/464,551.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Office Action dated Jul. 12, 2018 issued in U.S. Appl. No. 15/483,926.
U.S. Notice of Allowance dated Dec. 31, 2018 issued in U.S. Appl. No. 15/483,926.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Final Office Action dated Nov. 15, 2017 issued in U.S. Appl. No. 15/251,772.
U.S. Office Action dated Feb. 22, 2018 issued in U.S. Appl. No. 15/251,772.
U.S. Office Action dated Sep. 4, 2018 issued in U.S. Appl. No. 15/251,772.
U.S. Final Office Action dated Dec. 21, 2018 issued in U.S. Appl. No. 15/251,772.
U.S. Notice of Allowance dated Mar. 5, 2019 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S.Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.
U.S. Notice of Allowance dated Sep. 22, 2017 issued in U.S. Appl. No. 15/052,293.
U.S. Notice of Allowance [Supplemental Notice of Allowability] dated Oct. 19, 2017 issued in U.S. Appl. No. 15/052,293.
U.S. Office Action dated Jul. 24, 2018 issued in U.S. Appl. No. 15/835,131.
U.S. Notice of Allowance dated Dec. 4, 2018 issued in U.S. Appl. No. 15/835,131.
U.S. Office Action dated Mar. 6, 2019 issued in U.S. Appl. No. 15/835,131.
U.S. Notice of Allowance dated May 13, 2019 issued in U.S. Appl. No. 15/835,131.

(56) References Cited

OTHER PUBLICATIONS

U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Aug. 14, 2018 issued in U.S. Appl. No. 15/621,935.
U.S. Final Office Action dated Feb. 14, 2019 issued in U.S. Appl. No. 15/621,935.
U.S. Notice of Allowance dated May 22, 2019 issued in U.S. Appl. No. 15/621,935.
U.S. Supplemental Notice of Allowance dated Jun. 13, 2019 issued in U.S. Appl. No. 15/621,935.
U.S. Office Action dated Oct. 21, 2019 issued in U.S. Appl. No. 15/621,935.
U.S. Office Action dated Nov. 3, 2017 issued in U.S. Appl. No. 15/138,802.
U.S. Final Office Action dated Mar. 1, 2018 issued in U.S. Appl. No. 15/138,802.
U.S. Advisory Action dated May 16, 2018 issued in U.S. Appl. No. 15/138,802.
U.S. Notice of Allowance dated Jul. 3, 2018 issued in U.S. Appl. No. 15/138,802.
U.S. Office Action dated Jun. 23, 2017 issued in U.S. Appl. No. 15/190,089.
U.S. Notice of Allowance dated Aug. 10, 2017 issued in U.S. Appl. No. 15/190,089.
U.S. Office Action dated Dec. 13, 2018 issued in U.S. Appl. No. 15/690,108.
U.S. Office Action dated Jul. 5, 2019 issued in U.S. Appl. No. 15/690,108.
U.S. Notice of Allowance dated Jan. 29, 2020 issued in U.S. Appl. No. 15/690,108.
U.S. Office Action dated May 24, 2019 issued in U.S. Appl. No. 15/479,103.
U.S. Final Office Action dated Sep. 20, 2019 issued in U.S. Appl. No. 15/479,103.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
Japanese Office Action dated Dec. 4, 2018 issued in JP 2016-566814.
PCT International Search Report and Written Opinion dated May 26, 2016 issued in PCT/US2016/019513.
PCT International Preliminary Report on Patentability and Written Opinion dated Sep. 8, 2017 issued in PCT/US2016/019513.
Japanese Office Action dated Jul. 30, 2019 issued in JP 2017-518338.
Japanese Office Action dated Jul. 9, 2019 issued in JP 2018-114012.
PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Nov. 8, 2018 issued in PCT/US2018/035848.
PCT International Preliminary Report on Patentability and Written Opinion dated Dec. 26, 2019 issued in PCT/US2018/035848.
PCT International Search Report and Written Opinion dated Sep. 15, 2016 issued in PCT/US2016/029528.
PCT International Preliminary Report on Patentability and Written Opinion dated Oct. 31, 2017 issued in PCT/US2016/029528.
PCT International Search Report and Written Opinion dated Sep. 29, 2016 issued in PCT/US2016/039089.
PCT International Preliminary Report on Patentability and Written Opinion dated Dec. 26, 2017 issued in PCT/US2016/039089.
PCT International Search Report and Written Opinion dated Jan. 19, 2017 issued in PCT/US2016/055997.
PCT International Preliminary Report on Patentability and Written Opinion dated Apr. 26, 2018 issued in PCT/US2016/055997.
PCT International Search Report and Written Opinion dated Aug. 14, 2017 issued in PCT/US2017/026812.
PCT International Preliminary Report on Patentability dated Nov. 1, 2018 issued in PCT/US2017/026812.
"Electronic Foot Size Measuring Devices," Sensatech Research LTD., *Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (©2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.
"The Emed®-Systems," [retrieved at http://www.novel.de/novelcontent/emed on Sep. 17, 2015] *novel.de*, 4 pages.
U.S. Appl. No. 15/630,840, filed Jun. 22, 2017, McMillen et al.
U.S. Appl. No. 16/692,626, filed Nov. 22, 2019, Lacy et al.
U.S. Final Office Action dated Jan. 12, 2022, in U.S. Appl. No. 16/692,626.

* cited by examiner

ALIGNMENT MECHANISMS SENSOR SYSTEMS EMPLOYING PIEZORESISTIVE MATERIALS

An Application Data Sheet is filed concurrently with this specification as part of this application. Each application to which this application claims benefit or priority as identified in the concurrently filed Application Data Sheet is incorporated by reference herein in its entirety and for all purposes.

SUMMARY

According to a particular class of implementations, a sensor system includes a first substrate having a plurality of conductive traces thereon. Each of a plurality of pieces of piezoresistive material is positioned to contact a corresponding set of the conductive traces and forms a sensor therewith. A second substrate includes a plurality of depressions in a surface thereof, and a plurality of posts extending from the surface through corresponding apertures in the first substrate, thereby aligning each sensor with a corresponding one of the depressions.

According to a particular implementation of this class, each depression in the surface of the second substrate is configured such that there is a space between the corresponding piece of piezoresistive material and the second substrate when there is no force exerted on the sensor system.

According to another implementation of this class, each depression in the surface of the second substrate is configured such that the corresponding piece of piezoresistive material is in contact with the second substrate when there is no force exerted on the sensor system.

According to another implementation of this class, each depression in the surface of the second substrate is configured such that substantially no force is registered by the corresponding sensor when there is no force exerted on the sensor system.

According to another implementation of this class, each depression in the surface of the second substrate is configured to determine a dynamic range of the corresponding sensor.

According to another implementation of this class, each depression in the surface of the second substrate is configured to allow the corresponding piece of piezoresistive material to decompress after force is exerted on the sensor system.

According to another implementation of this class, the piezoresistive material is a fabric.

According to another implementation of this class, each of the pieces of piezoresistive material is secured to the first substrate with an adhesive element. Each adhesive element has an aperture through which the corresponding piece of piezoresistive material contacts the corresponding set of traces.

According to another implementation of this class, the second substrate is a molded foam rubber material.

According to another implementation of this class, a third substrate includes an adhesive configured to secure the first substrate to the second substrate. The third substrate includes apertures aligned with the posts and depressions of the second substrate.

According to another implementation of this class, a third substrate includes an adhesive configured to secure the first substrate to the second substrate and to enclose the first substrate and the sensors between the second and third substrates.

According to another implementation of this class, each set of conductive traces includes a pair of the conductive traces. Each pair of conductive traces has interdigitated portions.

According to another implementation of this class, the posts are configured to counteract shear forces acting on the sensor system.

According to another implementation of this class, all of the conductive traces are disposed on one side of the first substrate.

According to another implementation of this class, the conductive traces are disposed on both sides of the first substrate.

According to another class of implementations, methods of manufacturing a sensor system are provided. A plurality of apertures is formed in a first substrate. A plurality of conductive traces is formed on the first substrate. The plurality of conductive traces includes a plurality of sets of sensor traces. Each of a plurality of pieces of piezoresistive material is aligned with a corresponding one of the sets of sensor traces. Each piece of piezoresistive material is positioned to contact the corresponding set of sensor traces. A second substrate has a plurality of posts extending from a surface thereof, and a plurality of depressions in the surface thereof. The depressions of the second substrate are aligned with the pieces of piezoresistive material by inserting each of the posts of the second substrate in a corresponding one of the apertures of the first substrate.

According to a particular implementation of this class, each depression in the surface of the second substrate is configured such that there is a space between the corresponding piece of piezoresistive material and the second substrate when the posts are fully inserted in the apertures.

According to another implementation of this class, each depression in the surface of the second substrate is configured such that the corresponding piece of piezoresistive material is in contact with the second substrate when the posts are fully inserted in the apertures.

According to another implementation of this class, each of the pieces of piezoresistive material is secured to the first substrate with an adhesive element. Each adhesive element has an aperture through which the corresponding piece of piezoresistive material contacts the corresponding set of sensor traces.

According to another implementation of this class, the first substrate is secured to the second substrate with a third substrate. The third substrate includes an adhesive and apertures aligned with the posts and depressions of the second substrate.

A further understanding of the nature and advantages of various implementations may be realized by reference to the remaining portions of the specification and the drawings.

DETAILED DESCRIPTION

Figure 1:
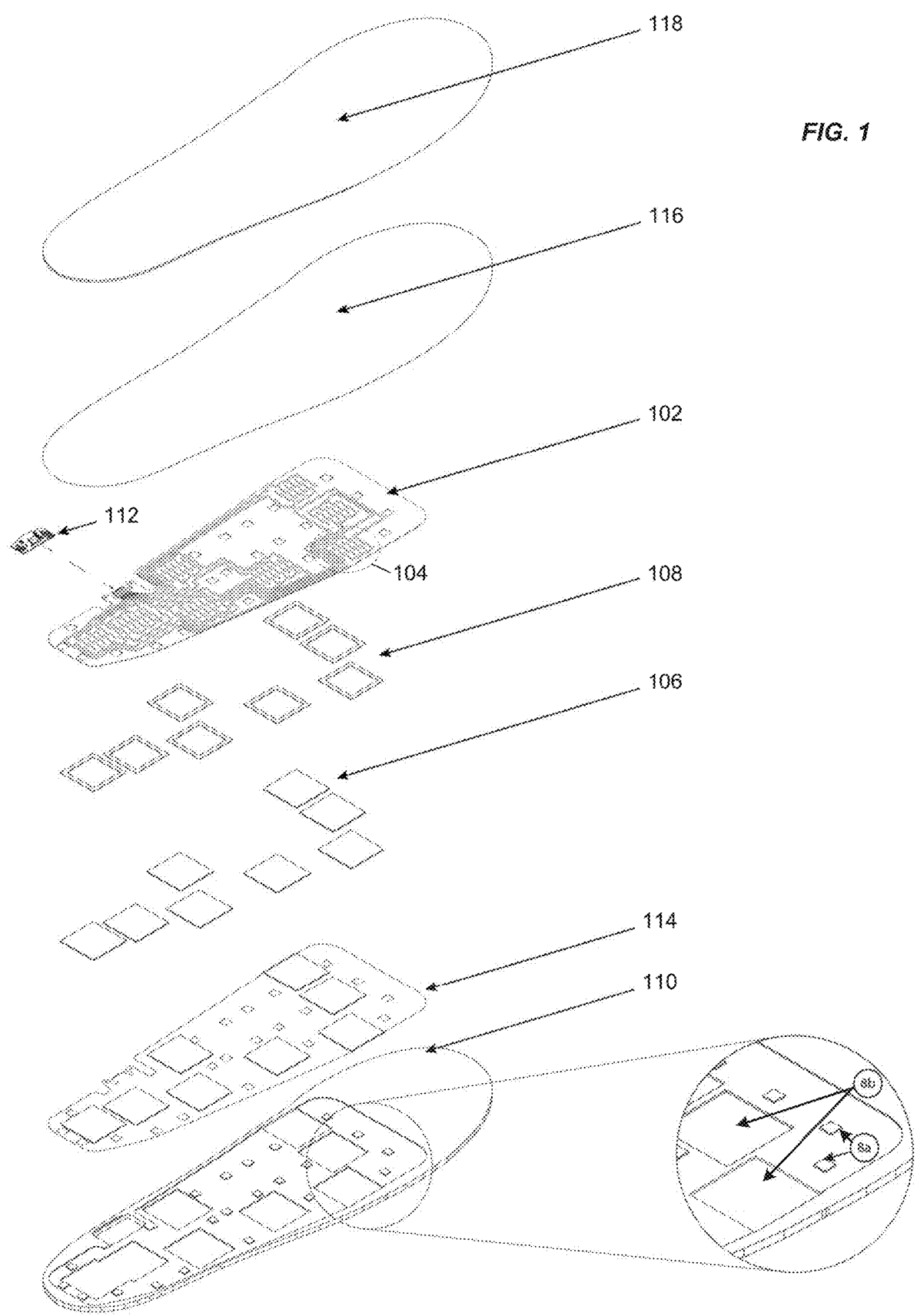
FIG. 1 is an exploded view of a particular implementation of a sensor system enabled by the present disclosure.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity. This disclosure describes devices and systems that employ sensor technology. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Some implementations described herein relate to sensor devices or systems that include piezoresistive materials. Piezoresistive materials include any of a class of materials that exhibit a change in electrical resistance in response to mechanical force (e.g., pressure, impact, distortion, etc.) applied to the material. One class of devices described herein includes conductive traces formed directly on or otherwise integrated with a dielectric substrate with piezoresistive material that is adjacent and/or tightly integrated with the dielectric substrate and in contact with at least some of the traces on the dielectric. Another class of devices described herein includes conductive traces formed directly on or otherwise integrated with a substrate of piezoresistive material, e.g., a piezoresistive fabric. When force is applied to such either type of device, the resistance between traces connected by the piezoresistive material changes in a time-varying manner that is representative of the applied force.

A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable circuitry), and mapped (e.g., by the associated processor, controller, or circuitry, or a separate control system) to a control function that may be used in conjunction with the control and/or operation of virtually any type of process, device, or system.

According to some implementations, the piezoresistive material with which the traces are in contact or on which the traces are formed may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the dielectric substrate or the piezoresistive material using any of a variety of conductive inks or paints. More generally, implementations are contemplated in which the conductive traces are formed using any conductive material that may be formed on either type of substrate. It should be understood with reference to the foregoing that, while specific implementations are described with reference to specific materials and techniques, the scope of this disclosure is not so limited.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material (which may be, for example, a polyester felt) is selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. In some implementations, the fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphene particles. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of materials that exhibit a change in resistance or conductivity when force is applied to the material may be suitable for implementation of sensors as described herein.

According to a particular class of implementations, conductive traces having varying levels of conductivity are formed on a dielectric substrate or piezoresistive material using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable. The degree of conductivity for different traces and applications may be controlled by the amount or concentration of conductive particles (e.g., silver, copper, aluminum, carbon, etc.) suspended in the silicone. These inks can be screen printed or printed from an inkjet printer. According to some implementations, the substrate on which the inks are printed are non-stretchable allowing for the use of less expensive inks that are low in flexibility and/or stretchability. Another class of implementations uses conductive paints (e.g., carbon particles mixed with paint) such as those that are commonly used for EMI shielding and ESD protection.

Additional examples of sensor technology and related techniques that may be used with various implementations enabled by the present disclosure are described in U.S. Pat. No. 8,680,390 entitled Foot-Operated Controller issued on Mar. 25, 2014, U.S. Pat. No. 9,076,419 entitled Multi-Touch Pad Controller issued on Jul. 7, 2015, U.S. Pat. No. 9,965,076 entitled Piezoresistive Sensors and Applications issued on May 8, 2018, U.S. Pat. No. 9,442,614 entitled Two-Dimensional Sensor Arrays issued on Sep. 13, 2016, U.S. Pat. No. 9,863,823 entitled Sensor Systems Integrated With Footwear issued on Jan. 9, 2018, U.S. Pat. No. 10,362,989 entitled Sensor System Integrated With a Glove issued on Jul. 30, 2019, and U.S. Pat. No. 9,721,553 entitled Sensor-Based Percussion Device issued on Aug. 1, 2017. The entire disclosure of each of the foregoing patent documents is incorporated herein by reference for all purposes. However, it should also be noted that implementations are contemplated that employ other suitable sensor technologies in a wide variety of applications. The scope of this disclosure should therefore not be limited by reference to these examples.

FIG. 1 depicts an exploded view of a particular implementation of an insole sensor system for integration with footwear. As will be appreciated, the basic topology and features of the system shown in FIG. 1 may be adapted for a wide range of applications beyond the example of footwear. Further information about details and features that may be employed with implementations enabled by the present disclosure are provided in U.S. Pat. No. 9,863,823 entitled Sensor Systems Integrated with Footwear, incorporated by reference above.

Substrate 102 is a flexible substrate of polyethylene terephthalate (PET) on the underside of which (relative to the depicted stack) conductive traces are formed. Interdigitated sections (e.g., 104) of eight pairs of the traces form eight sensors with pieces of piezoresistive fabric 106 which are secured to substrate 102 by pressure sensitive adhesive (PSA) elements 108. Each piece of piezoresistive fabric 106 makes contact with a corresponding set of traces through the opening in each PSA element 108. Other methods such as, for example, glue applied by surface mount equipment, can be used to adhere the pieces of piezoresistive fabric to the PET substrate 102.

Substrate 110 is a molded foam rubber material with depressions 8b and alignment posts 8a that, when the assembly is complete, alignment posts 8a extend through corresponding apertures in substrate 102 such that the pieces of piezoresistive fabric 106 secured to substrate 102 are aligned with corresponding depressions 8b in substrate 110. According to a particular implementation, the depth of the depressions in substrate 110 may be such that, when no force is exerted on the assembly, there is a space between each of the pieces of piezoresistive fabric and the bottom of the corresponding depression. Other implementations are contemplated in which there may be contact between the fabric and the depression under such conditions, but the force exerted on the fabric is minimal.

Implementations are also contemplated in which the alignment posts and depressions may not be part of or associated with the same substrate. For example, alignment posts might extend from substrate 102 downward through the stack of components into corresponding depressions or apertures in substrate 110. Alternatively, alignment posts could extend from both sides of substrate 114; upward into corresponding apertures in substrate 102, and downward into corresponding depressions or apertures in substrate 110. The scope of the present disclosure should therefore not be limited to the specific configuration shown in FIG. 1.

Sensor circuitry that activates and receives signals from the sensors is disposed on printed circuit board (PCB) 112 which interfaces with the conductive traces on substrate 102 at a connector at the edge of substrate 102 as shown.

Substrate 102 is secured to substrate 110 with adhesive layer 114 which has apertures aligned with the depressions 8b and alignment posts 8a of substrate 110. Adhesive layer 116 secures the entire assembly, enclosing the previous described components between layer 116 and substrate 110, and securing comfort liner 118 to the assembly.

According to various implementations, the alignment posts 8a on substrate 110 may serve multiple purposes. One purpose is to counteract shear forces. That is, as a person walks there are lateral forces parallel to the ground that induce shear across the insole. The posts reduce that effect while maintaining the alignment of the system components. The posts are also useful during manufacturing to facilitate the alignment of components.

The depressions 8b in substrate 110 receive the pieces of piezoresistive fabric 106. As mentioned above, each piece of fabric may be slightly off-contact or only in minimal contact with the floor of its corresponding depression. This reduces the likelihood that the fabric will delaminate with a shear force, i.e., because there is less friction with the foam substrate not being in strong contact with the fabric.

This arrangement also helps return each sensor signal to zero when little or no force is applied on the assembly. That is, the depression preserves the low end of the dynamic range of each sensor because it allows the fabric to decompress in the absence of force, allowing the sensor's signal to return to substantially zero. The depth of the depression and the stiffness or pliability of the foam substrate might also be controlled or manipulated to affect the high end of the dynamic range. For example, the configuration of the depression might result in greater force being required to compress the fabric against the bottom of the depression, thereby extending the dynamic range of the sensor. According to a particular implementation, each sensor has an activation force (i.e., the amount of force required for the sensor to register force) of about one kilogram. However, as will be understood, implementations are contemplated in which this activation force and/or the dynamic range of the sensors vary considerably.

The sensor system depicted in FIG. 1 may be manufactured inexpensively in that the number and placement of the sensors allows for a single screen printing of the conductive traces on substrate 102. However, other more complicated topologies are also contemplated as being within the scope of this disclosure. This includes implementations in which conductive traces cross over each other (through the use of insulating materials) and/or are formed on both sides of the substrate (e.g., sensor traces on one side and routing traces on the other).

Figure 2:
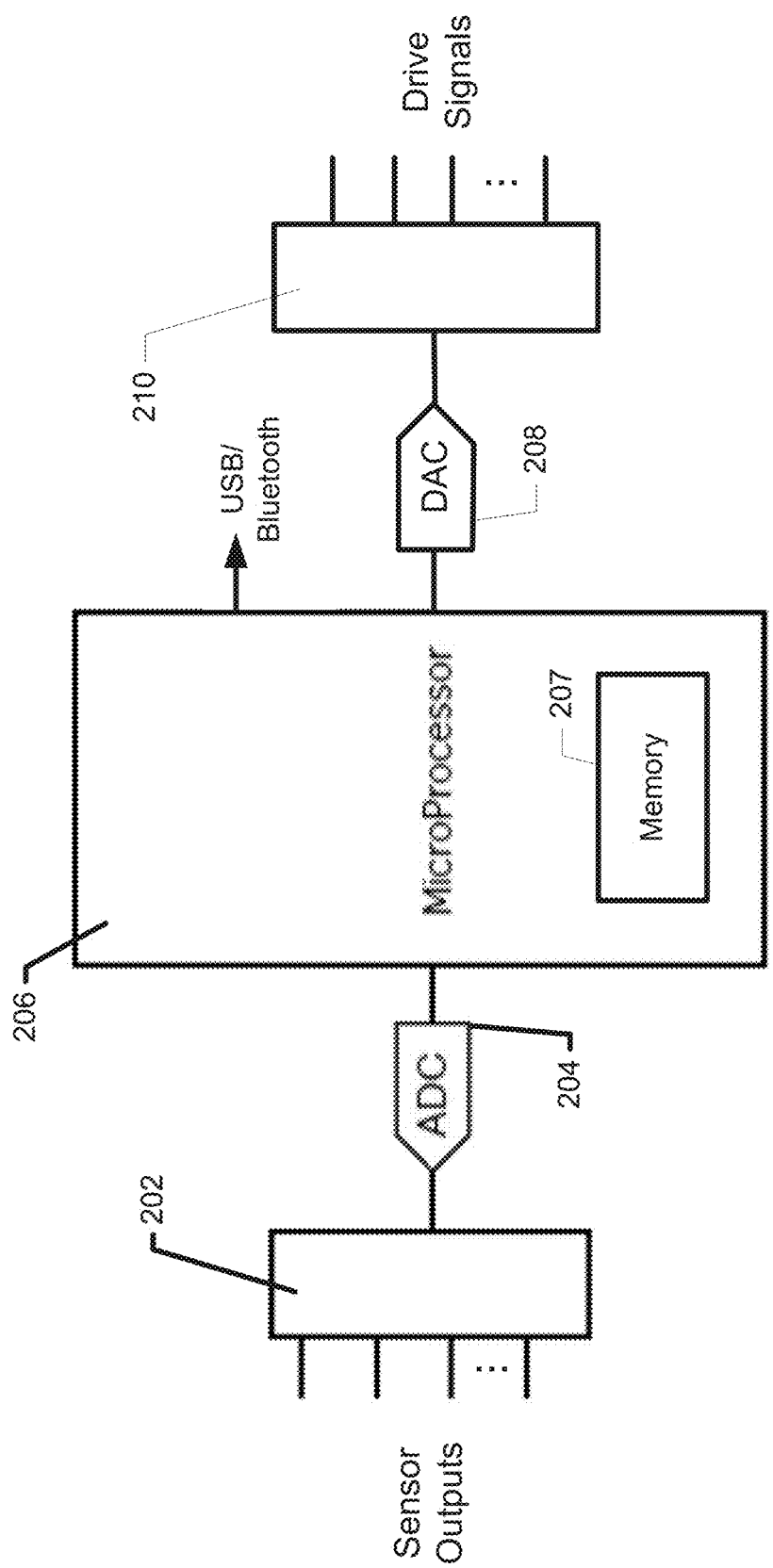
FIG. 2 is a simplified block diagram of sensor circuitry for use with various implementations enabled by the present disclosure.

FIG. 2 is a simplified diagram of sensor circuitry that may be provided on a PCB for use with implementations described herein. For example, in the sensor assembly described above with reference to FIG. 1, such sensor circuitry could be provided on PCB 112. When pressure is applied to one of the sensors, a resulting signal (captured via the corresponding traces) is received and digitized (e.g., via multiplexer 202 and A-to-D converter 204) and may be processed locally (e.g., by processor 206) and/or transmitted to a connected device (e.g., via a USB or Bluetooth connection). The sensors may be selectively energized by the sensor circuitry (e.g., under the control of processor 206 via D-to-A converter 208 and multiplexer 210) to effect the generation of the sensor signals.

In addition to transmission of data to and from a connected device, power may be provided to the sensor circuitry via a USB connection. Alternatively, systems that transmit data wirelessly (e.g., via Bluetooth) may provide power to the sensor circuitry using any of a variety of mechanisms and techniques including, for example, using one or more batteries, solar cells, and/or mechanisms that harvest mechanical energy. The LTC3588 (provided by Linear Technology Corporation of Milpitas, Calif.) is an example of an energy harvesting power supply that may be used with at least some of these diverse energy sources. Other suitable variations will be appreciated by those of skill in the art. And as will be appreciated, the sensor circuitry shown in FIG. 2 is merely an example. A wide range of sensor circuitry components, configurations, and functionalities are contemplated. An example of a device suitable for implementing processor 156 is the C8051F380-GM controller provided by Silicon Labs of Austin, Tex.

As will be understood, the responses of the sensors in arrays suitable for use with implementations enabled by the present disclosure may exhibit variation relative to each other. Therefore, calibrated sensor data may be stored (e.g., in memory 207 of processor 206) representing the response of each of the sensors. Such data may be used for ensuring consistency in the way the sensor outputs are processed and/or used to represent applied forces. During calibration, the output of each sensor (e.g., as captured by ADC 204) is measured for a range of known input forces. This may be done, for example, by placing each sensor on a scale, applying force to that sensor, and recording a value in memory for each of a plurality of ADC values that represents a corresponding value reported by the scale. In this way, a set of data points for each sensor is captured (e.g., in a table in memory 207) associating ADC values with corresponding forces (e.g., weights in grams or kilograms). The data set for each sensor may capture a force value for every possible value of the ADC output. Alternatively, fewer data points may be captured and the sensor circuitry may use interpolation to derive force values for ADC outputs not represented in the data set.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A sensor system, comprising:
a first substrate having a plurality of conductive traces thereon;
a plurality of pieces of piezoresistive material, each piece of piezoresistive material being positioned to contact a corresponding set of sections of the conductive traces within a corresponding region defined by an area of overlap of the first substrate by that piece of piezoresistive material when viewed along an axis perpendicular to the first substrate and thereby form a sensor therewith, wherein, for each set of sections of the conductive traces:
that set of sections of the conductive traces has at least a corresponding first section of one of the conductive traces and a corresponding second section of another of the conductive traces, and
both the corresponding first section and the corresponding second section of that set of sections of the conductive traces are, within the corresponding region, separated from each other within the first substrate; and
a second substrate, the second substrate including a plurality of depressions in a surface thereof, and a plurality of posts extending from the surface through corresponding apertures in the first substrate, thereby aligning each sensor with a corresponding one of the depressions.

2. The sensor system of claim 1, wherein at least one depression in the surface of the second substrate is configured such that there is a space between the corresponding piece of piezoresistive material and the second substrate when there is no force exerted on the sensor system.

3. The sensor system of claim 1, wherein at least one depression in the surface of the second substrate is configured such that the corresponding piece of piezoresistive material is in contact with the second substrate when there is no force exerted on the sensor system.

4. The sensor system of claim 1, wherein at least one depression in the surface of the second substrate is configured such that substantially no force is registered by the corresponding sensor when there is no force exerted on the sensor system.

5. The sensor system of claim 1, wherein at least one depression in the surface of the second substrate is configured to determine a dynamic range of the corresponding sensor.

6. The sensor system of claim 1, wherein at least one depression in the surface of the second substrate is configured to allow the corresponding piece of piezoresistive material to decompress after force is exerted on the sensor system.

7. The sensor system of claim 1, wherein the piezoresistive material is a fabric.

8. The sensor system of claim 1, wherein at least one of the pieces of piezoresistive material is secured to the first substrate with an adhesive element, each adhesive element having an aperture through which the corresponding piece of piezoresistive material contacts the corresponding set of traces.

9. The sensor system of claim 1, wherein the second substrate is a molded foam rubber material.

10. The sensor system of claim 1, further comprising a third substrate, the third substrate including an adhesive configured to secure the first substrate to the second substrate, the third substrate including apertures aligned with the posts and depressions of the second substrate.

11. The sensor system of claim 1, further comprising a third substrate, the third substrate including an adhesive configured to secure the first substrate to the second substrate and to enclose the first substrate and the sensors between the second and third substrates.

12. The sensor system of claim 1, wherein the first section and the second section of at least one of the sets of sections of the conductive traces are interdigitated with one another.

13. The sensor system of claim 1, wherein the posts are configured to counteract shear forces acting on the sensor system.

14. The sensor system of claim 1, wherein all of the conductive traces are disposed on one side of the first substrate.

15. The sensor system of claim 1, wherein portions of at least one of the conductive traces are disposed on both sides of the first substrate.

* * * * *